United States Patent [19]

Maddali et al.

[11] Patent Number: 5,327,335
[45] Date of Patent: Jul. 5, 1994

[54] HARMONIC FEEDBACK CONTROL FOR AN INVERTER

[75] Inventors: Vijay K. Maddali, Rockford; Albert L. Markunas, Roscoe, both of Ill.

[73] Assignee: Sundstrand Corporation, Rockford, Ill.

[21] Appl. No.: 952,108

[22] Filed: Sep. 28, 1992

[51] Int. Cl.$^5$ .............................................. H02M 1/12
[52] U.S. Cl. ........................................ 363/39; 363/40; 363/41; 363/95; 363/97; 363/98; 363/132
[58] Field of Search ................. 363/39, 40, 41, 95-98, 363/132, 137; 307/105

[56] References Cited

U.S. PATENT DOCUMENTS

| | | |
|---|---|---|
| 3,614,589 | 10/1971 | Ireland et al. ............... 321/9 A |
| 4,527,226 | 7/1985 | Glennon ............................. 363/41 |
| 4,692,855 | 9/1987 | Kuroiwa et al. .................. 363/95 |
| 4,835,411 | 5/1989 | Takeda ............................. 307/105 |
| 4,961,130 | 10/1990 | Kirchber, Jr. ..................... 363/41 |
| 4,994,956 | 2/1991 | Kirchberg et al. ................ 363/95 |
| 5,001,622 | 3/1991 | Kirchberg, Jr. et al. .......... 363/95 |
| 5,016,157 | 5/1991 | Rozman et al. .................. 363/39 |
| 5,034,876 | 7/1991 | Kirchberg, Jr. et al. .......... 363/97 |
| 5,043,857 | 8/1991 | Kirchberg, Jr. et al. .......... 363/41 |
| 5,053,939 | 10/1991 | Kirchberg, Jr. et al. .......... 363/41 |

FOREIGN PATENT DOCUMENTS 60-39375  3/1985  Japan .

Primary Examiner—Steven L. Stephan
Assistant Examiner—Adolf Berhane
Attorney, Agent, or Firm—Marshall, O'Toole, Gerstein, Murray & Borun

[57] ABSTRACT

Harmonics in the AC output power of an inverter are sensed and are compared to corresponding references to produce a plurality of errors. These errors are used to produce a harmonic waveform which is in turn used in a triangular waveform PWM pulse generator to generate PWM pulses. The PWM pulses control the inverter so as to convert DC power into AC power and so as to reduce harmonics in the AC power.

25 Claims, 3 Drawing Sheets

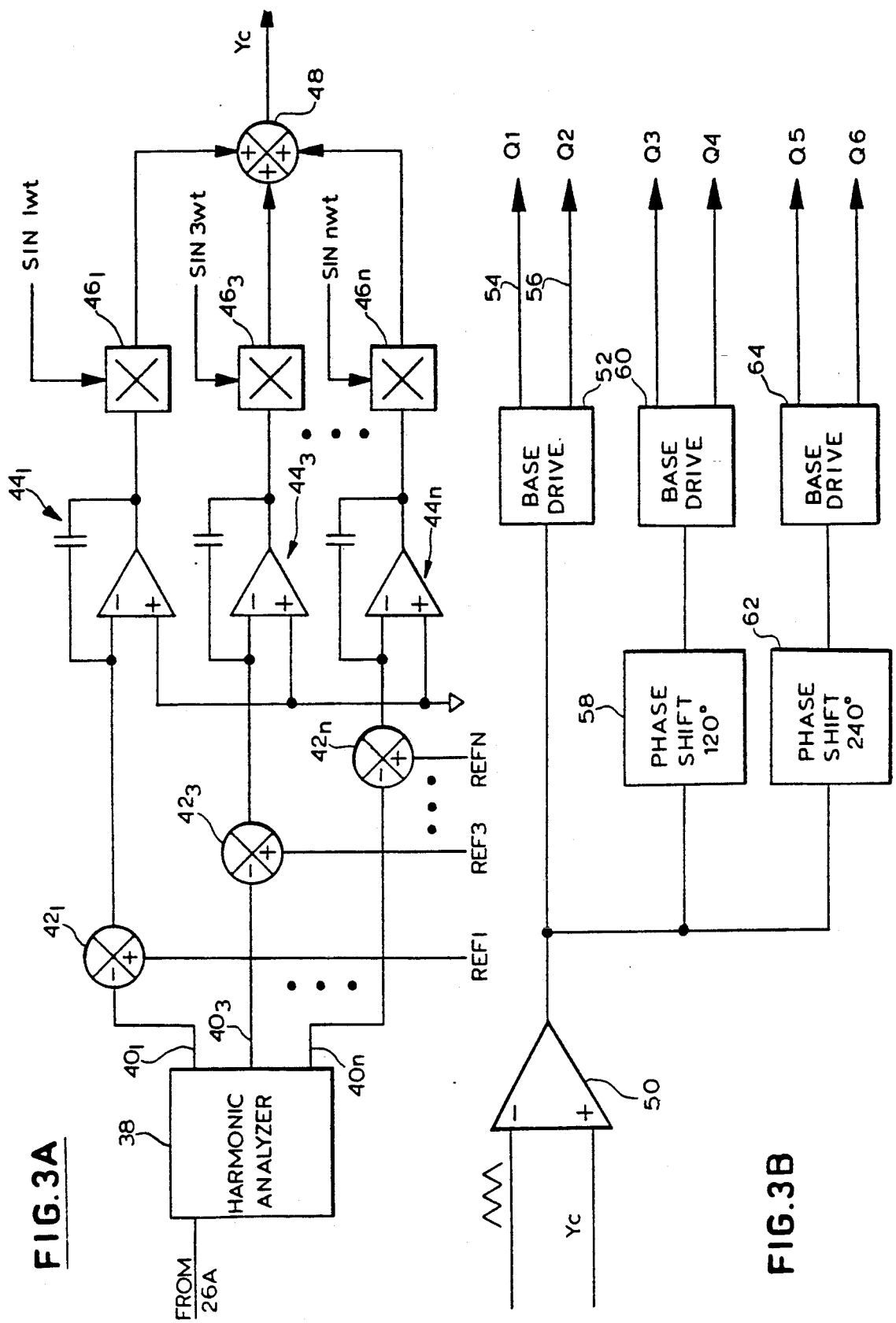

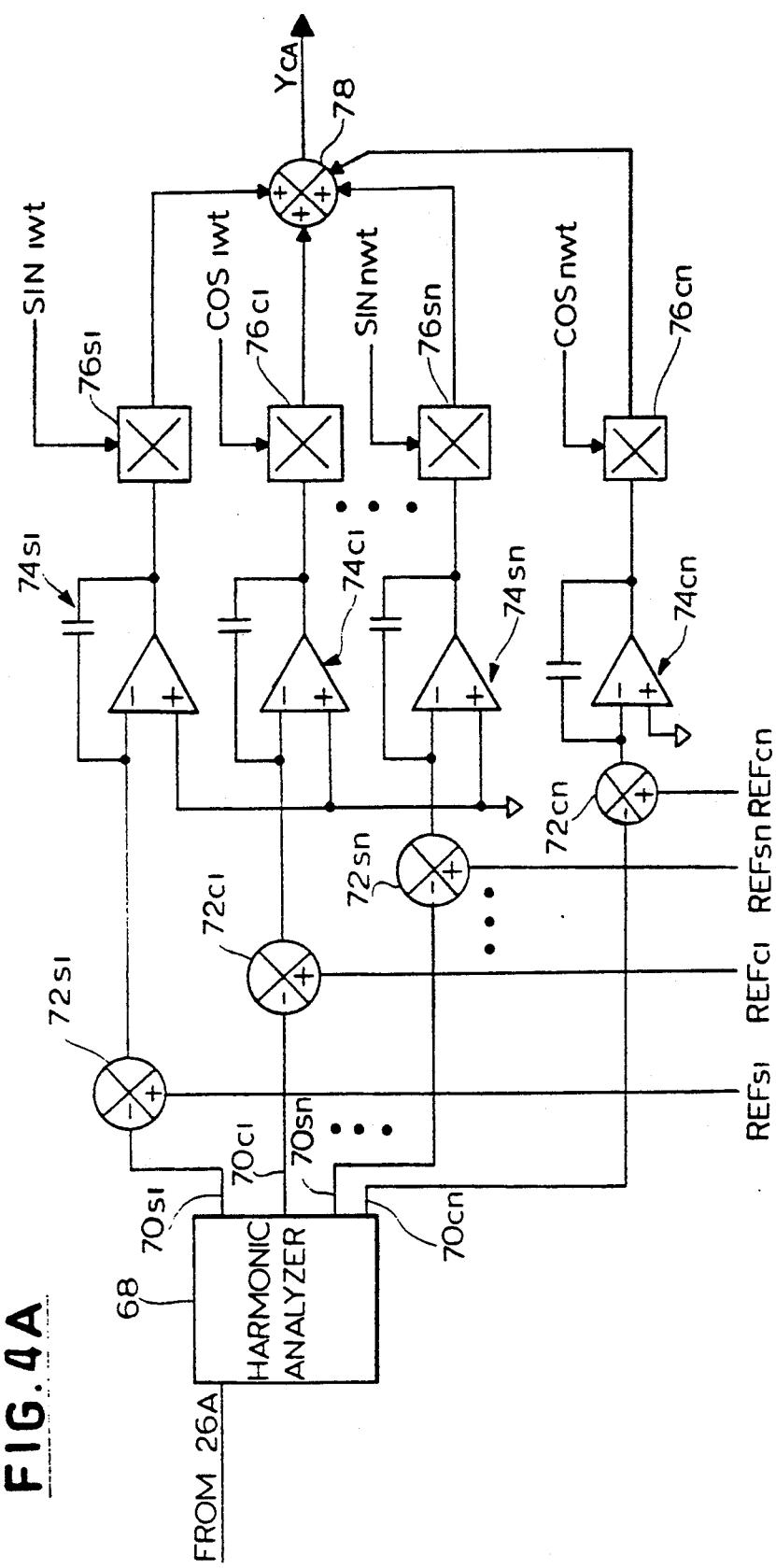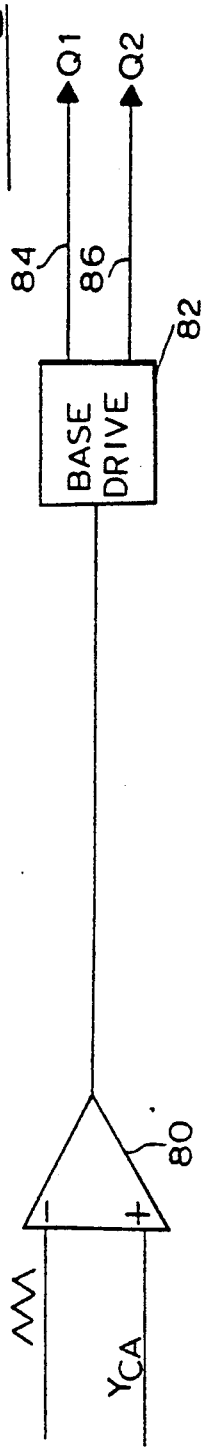

HARMONIC FEEDBACK CONTROL FOR AN INVERTER

FIELD OF THE INVENTION

The present invention relates generally to inverters for inverting direct current (DC) power to alternating current (AC) power and, more particularly, to such inverters which are controlled so as to reduce harmonic content in the AC output of the inverters.

BACKGROUND OF THE INVENTION

An inverter is employed to invert direct current power into alternating current power. In one form of such an inverter, a plurality of inverter switches are connected to a DC link and are controlled by pulse-width modulated (PWM) pulses. The inverter switches produce output PWM pulses which are supplied to a filter. The filter reduces or removes harmonics of an inverter fundamental frequency so that an AC output approximating an AC sinusoidal waveform is produced.

A common prior art PWM inverter control includes a comparator which compares a triangular waveform to a reference sinusoidal waveform. The reference sinusoidal waveform has the desired shape of the AC output from the inverter. The output of the comparator comprises a PWM waveform having a substantial frequency component at the desired inverter fundamental frequency.

Filters, particularly those which are arranged to filter out the lower frequency harmonics such as the fifth and seventh harmonics, are expensive, heavy and large. Many inverter systems control the inverter switches so as to reduce or eliminate a preselected number of the lower frequency harmonics in the inverter AC output. Thus, the filter is instead arranged to filter out higher frequency harmonics so that the expense, weight and size of the filter are accordingly reduced.

One system for supplying PWM pulses to the switches of an inverter is shown in U.S. Pat. No. 4,527,226 to Glennon In this system, a memory stores a plurality of PWM pulse patterns (or "angle sets") each having a unique set of switching angles. The switching angles of the stored angle sets are predetermined analytically so that selected harmonics in the inverter output can be minimized. A set of switching angles is selected from the memory based in part upon the power factor at the inverter output. This selected set of switching angles is supplied to the inverter switches so that the harmonic content in the output of the inverter is reduced.

Inverter systems utilizing stored patterns have limited harmonic reduction capability because only a limited number of angle sets are available for use. In such systems, if a power factor is sensed for which there is no stored angle set, the stored angle set associated with the power factor closest to the sensed power factor is selected. However, use of this angle set does not result in minimum harmonic content. Also, many prior art inverter systems assume that the DC voltage on the DC link is stiff, i.e., has no ripple. However, an inverter is bidirectional in the sense that any harmonic ripple in the output of the inverter passes back through the inverter to the DC link. This ripple on the DC link modulates the output of the inverter to produce further harmonic content in the inverter output. Inverter systems utilizing stored angled sets are typically not arranged to compensate for this additional harmonic content. Furthermore, many stored angle set systems do not directly measure harmonic content in the inverter output, but develop an approximation thereof, and hence cannot completely eliminate controlled harmonics.

A system in which the DC link is not assumed to be stiff and which senses the harmonic content in the output of an inverter is disclosed in Kirchberg, et al., U.S. Pat. No. 4,994,956. In this system, parameters of the inverter output are used to select an initial angle set from a memory storing a plurality of such angle sets. The Fourier coefficients of selected harmonics in the inverter output are determined and these Fourier coefficients are used to adjust the switching angles of the selected angle set in order to reduce the harmonic content in the inverter output regardless of whether this harmonic content arises from the PWM switching of the inverter switches or from harmonics passed back through the inverter to the DC link. This system has the further advantage in that harmonic reduction is not limited by the number of stored angle sets.

SUMMARY OF THE INVENTION

The present invention provides a closed loop system for the on-line, real time control of the switching angles of PWM pulses supplied to an inverter in order to reduce harmonic content in the output of the inverter.

According to one aspect of the invention, an inverter system includes an inverter for inverting DC power into AC power. Means are provided for sensing harmonics in the AC power. Means are coupled to the sensing means for generating a harmonic waveform having a harmonic component for each harmonic sensed in the AC power. Means are coupled to the generating means for controlling the inverter in accordance with the harmonic waveform such that the harmonics in the AC power are reduced.

According to another aspect of the invention, an inverter system is arranged for inverting DC power into AC power and for reducing harmonic content in the AC power. The AC power contains a fundamental frequency and the harmonic content includes harmonics of the fundamental frequency of the AC power. The inverter system includes an inverting means for inverting the DC power into the AC power. A harmonic sensing means senses components of the harmonics. A function generating means generates a sinusoidal function dependent upon the components of the harmonics. A PWM pulse generating means responds to the sinusoidal function by generating PWM pulses. The inverting means responds to the PWM pulses by inverting the DC power into AC power and by reducing harmonics in the AC power.

According to yet another aspect of the invention, a method of inverting DC power into AC power includes the steps of supplying DC power to an inverter, inverting the DC power into AC power, sensing harmonics in the AC power wherein each of the harmonics has a frequency, and comparing each of the harmonics to a reference in order to produce a plurality of errors wherein each error is dependent upon a different one of the harmonics. A plurality of multiplied functions is produced by multiplying each of the errors by a corresponding one of a plurality of a sinusoidal functions wherein each of the sinusoidal functions has the frequency of the harmonic from which its corresponding error is produced. The multiplied functions are compared to a triangular wave to produce PWM pulses and the PWM pulses are supplied to an inverter so as to invert the DC power into AC power and so as to reduce harmonics in the AC power.

BRIEF DESCRIPTION OF THE DRAWINGS

These and other features and advantages will become more apparent from a detailed consideration of the invention when taken in conjunction with the drawings in which:

FIGS. 3A and 3B show in greater detail one embodiment of the inverter controller of FIG. 1; and, FIGS. 4A and 4B show in greater detail a further embodiment of the inverter controller of FIG. 1.

DETAILED DESCRIPTION

Figure 1:
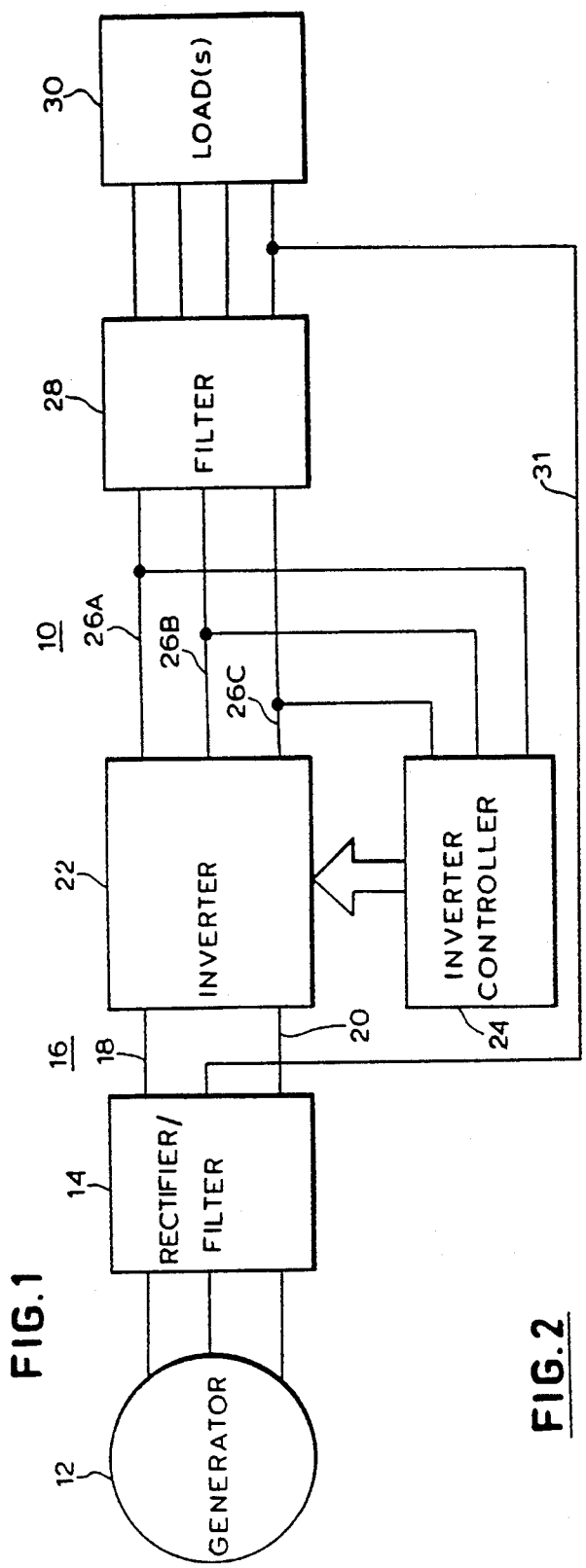
FIG. 1 is a block diagram of an inverter system according to the present invention.

As shown in FIG. 1, an inverter system 10 includes a synchronous generator 12 which is driven by a prime mover (not shown), such as an aircraft jet engine, and which produces three-phase, variable-frequency AC power. This variable-frequency AC power is converted by a rectifier/filter 14 into a DC voltage on a DC link 16. The DC link 16 includes a positive DC rail 18 and a negative DC rail 20. The positive DC voltage on the positive DC rail 18 and the negative DC voltage on the negative DC rail 20 are supplied to an inverter 22.

An inverter controller 24 supplies input PWM pulses to the inverter 22. In response to these input PWM pulses, the inverter 22 inverts the DC voltage on the DC link 16 into three-phase, constant-frequency AC power on inverter output lines 26A, 26B and 26C. The inverter 22 may alternatively develop a different number of phase outputs, if desired. As noted in greater detail hereinafter, the inverter controller 24 samples the voltages on the inverter output lines 26A, 26B and 26C in order to measure the harmonics in the output of the inverter 22 and controls the inverter 22 so as to reduce those harmonics. The inverter controller 24 may instead sense the harmonics at a point of regulation (POR), if desired.

The inverter output on each of the lines 26A, 26B and 26C is in the form of output PWM pulses. The output PWM pulses on the output line 26B are shifted in phase by 120° with respect to the output PWM pulses on the output line 26A, and the output PWM pulses on the output line 26C are shifted by an additional 120° with respect to the output PWM pulses on the output line 26A.

The output PWM pulses from the inverter 22 are filtered by a filter 28 in order to remove preselected harmonics from the output of the inverter 22. For example, the filter 28 may include an L-C filter having a corner frequency at the sixth harmonic in order to attenuate harmonics having frequencies above the frequency of the sixth harmonic. Furthermore, the filter 28 may also include notch filters for removing selected harmonics having frequencies above the frequencies of the harmonics controlled by the controller 24. The filter 28 smooths the output PWM pulses on the lines 26A, 26B and 26C into AC waveforms approximating sinusoidal waves. Each AC waveform is separated in phase by 120° from the other two AC waveforms and is supplied to one or more load(s) 30. A neutral line 31 connects the rectifier/filter 14 to the filter 28 and the load(s) 30. This neutral line 31 indicates that the rectifier portion of the rectifier/filter 14 is a half bridge rectifier and is at a potential midway between the voltages on the positive and negative rails 18 and 20.

Figure 2:
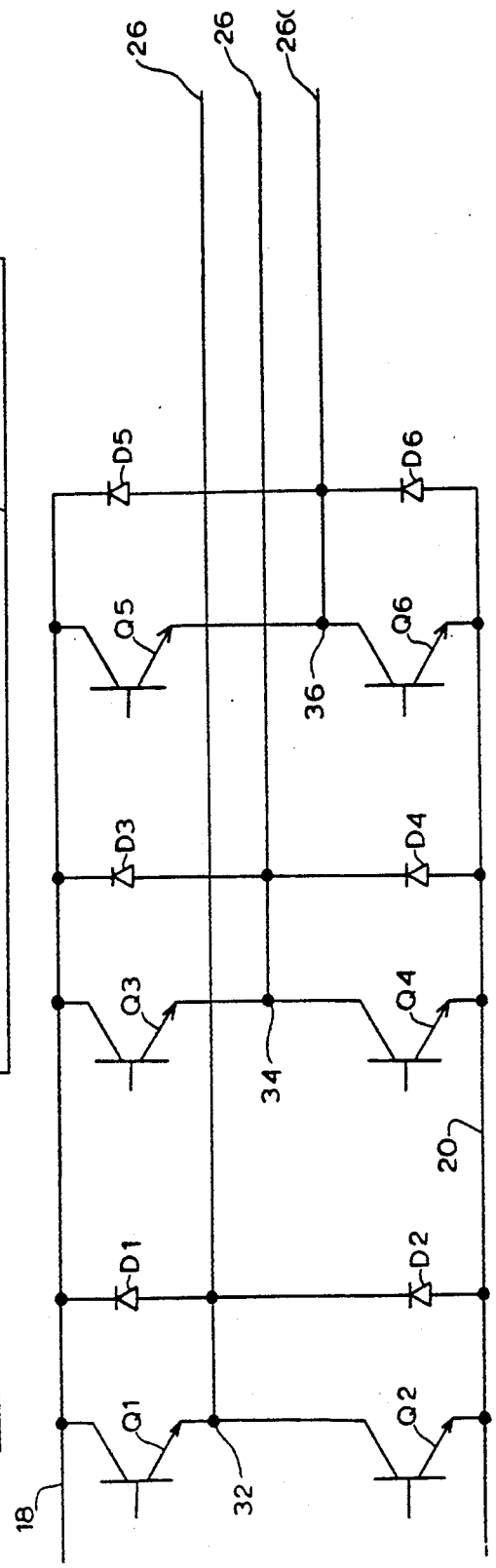
FIG. 2 shows the inverter of FIG. 1 in greater detail.

The inverter 22 is shown in greater detail in FIG. 2. This inverter 22 includes six transistors Q1–Q6 which are connected in a conventional three-phase bridge configuration and which are operated as switches by the inverter controller 24 to invert the DC power on the DC link 16 to AC power. A plurality of flyback diodes D1–D6 are connected in antiparallel relationship across the emitter-collector circuits of the transistors Q1–Q6.

FIGS. 3A and 3B, taken together, show the inverter controller 24 in greater detail. As shown in FIG. 3A, a harmonic analyzer 38 samples the voltage on the inverter output line 26A to determine the Fourier magnitude coefficients of the controlled components (i.e., the fundamental component and selected harmonics of interest) in the inverter output. Accordingly, the harmonic analyzer 38 has a plurality of output lines $40_1$–$40_n$ on which output signals are developed wherein each output signal has a magnitude substantially equal to the Fourier magnitude coefficient of a corresponding controlled harmonic. Thus, a first output signal on the output line $40_1$ from the harmonic analyzer 38 provides the Fourier magnitude coefficient of the first or fundamental harmonic or component in the output of the inverter 22, a second output signal on the output line $40_3$ provides the Fourier magnitude coefficient of the third harmonic of the inverter fundamental frequency in the output of the inverter 22, and so on with the output $40_n$ providing the Fourier magnitude coefficient of the nth harmonic in the output from inverter 22. The letter "n" represents the highest odd selected harmonic of interest.

The first output signal on the output line $40_1$ is subtracted by a summer $42_1$ from a first reference signal REF 1 to produce an error signal. The first reference REF 1 represents the desired magnitude of the inverter output voltage at the fundamental frequency. Also, the output signals on the output lines $40_3$–$40_n$ are subtracted from corresponding reference signals REF 3–REF N by summers $42_3$–$42_n$ to produce corresponding error signals. The reference signals REF 3–REF N represent the desired magnitudes of the third through the nth harmonics. Since it is desired to eliminate these harmonics, the reference signals REF 3–REF N are all equal to zero.

The error signal from the summer $42_1$ is integrated by an integrator $44_1$. Similarly, the error signals from the summers $42_3$–$42_n$ are integrated by corresponding integrators $44_3$–$44_n$. If the inverter controller 24 measures harmonic content at the POR at or near the load(s) 30, instead of at the output of the inverter 22, the integrators $44_1$, $44_3$ . . . $44_n$. may include compensation circuitry to compensate for the response of the filter 28 to each of the controlled harmonics. Thus, the term "inverter output" as used herein in connection with the measuring or sensing of the harmonics refers to the output of the inverter 22 and/or the output of the filter 28.

A multiplier $46_1$ multiplies the integrated error from the integrator $44_1$ by a sinusoidal waveform having a frequency equal to the frequency of the inverter fundamental frequency. A sinusoidal waveform may be a sine wave or a cosine wave. Accordingly, the output of the multiplier $46_1$ (which may also be referred to as a multiplied waveform) is a sinusoidal waveform having a magnitude determined by the integrated error between the reference REF 1 and the Fourier magnitude coefficient of the fundamental frequency in the inverter output. Similarly, multipliers $46_3$–$46_n$ multiply the outputs of the integrators $44_3$–$44_n$ by sinusoidal waveforms having the frequency of the third through nth harmonics, respectively, of the inverter fundamental frequency. The multiplied waveforms from the multipliers $46_1$, $46_3$...$46_n$ are combined by a summer 48 to form a composite harmonic waveform $Y_c$.

As shown in FIG. 3B, the composite waveform $Y_c$ is compared by a comparator 50 to a triangular waveform. When the magnitude of the triangular waveform is greater than the magnitude of the composite waveform $Y_c$, the output of the comparator is low; on the other hand, when the magnitude of the triangular waveform is less than the magnitude of the composite waveform $Y_c$, the output of the comparator is high. The comparator 50 generates several PWM pulses for each fundamental cycle of the composite waveform $Y_c$. These PWM pulses have switching angles determined by the result of comparing the composite waveform $Y_c$ to the triangular waveform. As the harmonic content in the output of the inverter changes, the composite waveform $Y_c$ changes and the switching angles of the PWM pulses consequently change. The switching angles control the Fourier magnitude coefficients of the fundamental component and the controlled harmonics at the reference levels established by REF 1–REF N.

A base drive circuit 52 receives the PWM pulses from the comparator 50 and produces PWM control signals for the upper and lower switches in each leg of the inverter 22. Thus, for example, a first PWM control signal is produced at an output 54 for the upper switch Q1 and a second PWM control signal is produced at an output 56 for the lower switch Q2. The first and second PWM control signals are arranged so that, when the PWM pulses in the first control signal on the output 54 are high, the PWM pulses in the second control signal on the output 56 are low, and vice versa. This ensures that the transistors Q1 and Q2 are not conducting at the same time; thus, a short circuit condition between the positive DC rail 18 and the negative DC rail 20 is avoided. Furthermore, as is known, the base drive circuit 52 may be arranged to ensure that the pulses on its outputs 54 and 56 satisfy the minimum on-times for the transistors Q1 and Q2.

The output from the comparator 50 is phase shifted by 120° by a phase shifter 58 and is supplied to a base drive circuit 60 which is identical to the base drive circuit 52. Accordingly, the transistors Q3 and Q4 are supplied with pulses similar to the pulses received by transistors Q1 and Q2 but shifted in phase by 120°.

The output from the comparator 50 is also phase shifted by 240° by a phase shifter 62 and is supplied to a base drive circuit 64 which is identical to the base drive circuits 52 and 60. Accordingly, the transistors Q5 and Q6 are supplied with pulses similar to the pulses received by transistors Q1 and Q2 but shifted in phase by 240°.

Since the PWM pulse patterns supplied to transistors Q3/Q4 and Q5/Q6 are merely shifted in phase relative to the PWM pulse pattern supplied to transistors Q1/Q2, it can be seen that the arrangement shown in FIGS. 3A and 3B is configured on the assumption that the load 30 remains balanced so that the phase relationships between the harmonics on the three inverter output lines 26A–26C remain constant and so that each harmonic on the inverter output line 26A is separated in phase from the corresponding harmonic on the inverter output lines 26B and 26C by 120° and 240° respectively.

On the other hand, for unbalanced loads, the phase relationships between the harmonics on the three inverter output lines 26A–26C may vary and the harmonics on the inverter output lines 26A–26C may be separated in phase from one another by angles other than 120°. In this event, three sets of the arrangement shown in FIG. 4A and 4B are utilized, one set for each phase of the inverter output. Thus, a first FIG. 4A/4B arrangement responds to the Fourier coefficients of the harmonics in phase A of the inverter outputs. Similarly, a second FIG. 4A/4B arrangement responds to the Fourier coefficients of the harmonics in phase B of the inverter outputs, and a third FIG. 4A/4B arrangement responds to the Fourier coefficients of the harmonics in phase C of the inverter outputs. Accordingly, with three sets of the arrangements shown in FIGS. 4A/4B, the inverter transistors Q1/Q2, Q3/Q4, and Q5/Q6 can be independently controlled in response to Fourier magnitude coefficients as well as Fourier phase coefficients so that selected harmonics of interest are effectively reduced even in the presence of unbalanced loads.

As shown in FIG. 4A, a harmonic analyzer 68 samples the voltage on the inverter output line 26A to determine the Fourier sine and cosine coefficients of the controlled harmonic components in the inverter output. Accordingly, the harmonic analyzer 68 has a plurality of output lines $70_{s1}$–$70_{sn}$ on which output signals are developed. Each such output signal has a magnitude substantially equal to the Fourier sine coefficient of a corresponding controlled harmonic. Similarly, the harmonic analyzer 68 has a plurality of output lines $70_{c1}$–$70_{cn}$ on which output signals are developed. Each such output signal has a magnitude substantially equal to the Fourier cosine coefficient of a corresponding controlled harmonic. Thus, the output line $70_{s1}$ from the harmonic analyzer 68 provides the Fourier sine coefficient of the first or fundamental harmonic or component in the Phase A output of the inverter 22, and so on with the output line $70_{sn}$ providing the Fourier sine coefficient of the nth harmonic in the Phase A output from inverter 22. The output line $70_{c1}$ from the harmonic analyzer 68 provides the Fourier cosine coefficient of the first or fundamental harmonic or component in the Phase A output of the inverter 22, and so on with the output line $70_{cn}$ providing the Fourier cosine coefficient of the nth harmonic in the Phase A output from inverter 22.

The signal on the output line $70_{s1}$ is subtracted by a summer $72_{s1}$ from a reference signal REF S1 to produce an error signal. The signal on the output line $70_{c1}$ is subtracted by a summer $72_{c1}$ from a reference signal REF C1 to produce an error signal. The references REF S1 and REF C1 represent the desired magnitudes for the Fourier sine and cosine coefficients, respectively, for the inverter output voltage at the fundamental frequency. The signal on the output line $70_{sn}$ is subtracted from the corresponding reference signal REF SN by a summer $42_{sn}$ to produce a corresponding error signal. The signal on the output line $70_{cn}$ is subtracted from the corresponding reference signal REF CN by a summer $42_{cn}$ to produce a corresponding error signal. The references REF SN and REF CN represent the desired magnitudes of the Fourier sine and cosine coefficients, respectively, for the inverter output voltage at the nth harmonic. Since it is desired to eliminate harmonics of the fundamental frequency but not the fundamental frequency itself, all reference signals, other than the reference signals REF S1 and REF C1, are equal to zero.

The error signal from the summer $72_{s1}$ is integrated by an integrator $74_{s1}$ and the error signal from the summer $72_{c1}$ is integrated by an integrator $74_{c1}$. Similarly, the error signal from the summer $72_{sn}$ is integrated by an integrator $74_{sn}$, and the error signal from the summer $72_{cn}$ is integrated by an integrator $74_{cn}$. A multiplier $76_{s1}$ multiplies the integrated error from the integrator $74_{s1}$ by a sine wave, $\sin(1\omega t)$, having a frequency equal to the frequency of the inverter fundamental frequency. Accordingly, the output of the multiplier $76_{s1}$ is a sine wave having a magnitude determined by the integrated error between the reference REF S1 and the Fourier sine coefficient of the phase A inverter output voltage at the fundamental frequency. A multiplier $76_{c1}$ multiplies the integrated error from the integrator $74_{c1}$ by a cosine wave, $\cos(1\omega t)$, having a frequency equal to the frequency of the inverter fundamental frequency. Accordingly, the output of the multiplier $76_{c1}$ is a cosine wave having a magnitude determined by the integrated error between the reference REF C1 and the Fourier cosine coefficient of the phase A inverter output voltage at the fundamental frequency.

Similarly, a multiplier $76_{sn}$ multiplies the integrated error from the integrator $74_{sn}$ by a sine wave, $\sin(n\omega t)$, having a frequency equal to the frequency of the nth harmonic of the inverter fundamental frequency. Accordingly, the output of the multiplier $76_{sn}$ by a sine wave, having a magnitude determined by the integrated error between the reference REF SN and the Fourier sine coefficient of the nth harmonic of the inverter fundamental frequency. A multiplier $76_{cn}$ multiplies the integrated error from the integrator $74_{cn}$ by a cosine wave, $\cos(n\omega t)$, having a frequency equal to the frequency of the nth harmonic of the inverter fundamental frequency. Accordingly, the output of the multiplier $76_{cn}$ is a cosine wave having a magnitude determined by the integrated error between the reference REF CN and the Fourier cosine coefficient of the nth harmonic of the inverter fundamental frequency. The multiplied waveforms from the multipliers $76_{s1}, 76_{c1} \ldots 76_{sn}, 76_{cn}$ are combined by a summer 78 to form a composite harmonic waveform $Y_{CA}$.

As shown in FIG. 4B, the composite waveform $Y_{CA}$ is compared by a comparator 80 to a triangular waveform. When the magnitude of the triangular waveform is greater than the magnitude of the composite waveform $Y_{CA}$, the output of the comparator is low; on the other hand, when the magnitude of the triangular waveform is less than the magnitude of the composite waveform $Y_{CA}$, the output of the comparator is high. The comparator 80 generates several PWM pulses for each fundamental cycle of the composite waveform $Y_{CA}$. These PWM pulses have switching angles determined by the result of comparing the composite waveform $Y_{CA}$ to the triangular waveform. As the harmonic content in the output of the inverter changes, the composite waveform $Y_{CA}$ changes and the switching angles of the PWM pulses consequently change. The switching angles control the Fourier sine and cosine coefficients of the fundamental component and the controlled harmonics at the reference levels established by REF S1, REF C1 . . . REF SN, REF CN.

A base drive circuit 82, similar to base drive circuit 52, receives the PWM pulses from the comparator 80 and produces PWM control signals for the upper and lower switches Q1 and Q2 in the inverter 22. The transistor pairs Q3/Q4 and Q5/Q6 are controlled by corresponding sets of the arrangement shown in FIGS. 4A/4B. However, in the case of the transistor pair Q3/Q4, the associated harmonic analyzer measures the Fourier coefficients in the phase B inverter output voltage, and, in the case of the transistor pair Q5/Q6, the associated harmonic analyzer measures the Fourier coefficients in the phase C inverter output voltage.

While the inverter controller 24 has been shown in the drawings as discrete circuit elements, it should be apparent that all or some of the functions performed by the circuit elements of FIGS. 3A and 3B and by the circuit elements of FIGS. 4A and 4B could be performed in a computer.

Many other modifications and variations of the present invention are possible in light of the above teachings. Thus, it is to be understood that, within the scope of the appended claims, the invention may be practiced otherwise than as specifically described.

We claim:

1. An inverter system comprising:
    an inverter for inverting DC power into AC power wherein the AC power includes a fundamental component and harmonics thereof;
    means connected between an AC output of the inverter and a load for sensing harmonics in the AC power;
    means coupled to the sensing means for generating a harmonic waveform having a harmonic component for each harmonic sensed in the AC power; and
    means coupled to the generating means for controlling the inverter in accordance with the harmonic waveform such that the harmonics in the AC power are reduced.

2. The inverter system of claim 1 wherein the sensing means comprises means for providing a plurality of output signals wherein each output signal is dependent upon a different one of the harmonics.

3. The inverter system of claim 2 wherein the sensing means further comprises means for comparing each of the output signals to a corresponding reference to produce a plurality of error signals each.

4. The inverter system of claim 3 wherein the generating means further comprises means for multiplying each of the error signals by a corresponding one of a plurality of sinusoidal waveforms to produce a plurality of multiplied waveforms, each of the sinusoidal waveforms having a frequency substantially equal to the frequency of an associated harmonic in the AC power.

5. The inverter system of claim 4 wherein the generating means further comprises means for combining the multiplied waveforms to produce the harmonic waveform.

6. The inverter system of claim 5 wherein the controlling means includes a comparator for comparing the harmonic waveform with a triangle wave to obtain a PWM waveform.

7. The inverter system of claim 6 wherein the inverter includes a plurality of inverter switches and wherein the controlling means further includes means for deriving control signals for the inverter switches from the PWM waveform.

8. The inverter system of claim 1 wherein each harmonic sensed in the AC power has a magnitude coefficient and a phase coefficient, and wherein the sensing means comprises providing means for providing a plurality of pairs of output signals, wherein each pair of output signals is dependent upon a magnitude coefficient and a phase coefficient of a different one of the harmonics.

9. The inverter system of claim 8 wherein the sensing means further comprises means for comparing each output signal of the plurality of pairs of output signals to a corresponding reference to produce a plurality of magnitude error signals and phase error signals.

10. The inverter system of claim 9 wherein the generating means further comprises means for multiplying each magnitude error signal by a corresponding one of a plurality of sine waves to produce a plurality of multiplied sine waves, each of the sine waves having a frequency substantially equal to the frequency of an associated harmonic in the AC power, and the generating means further comprises means for multiplying each phase error signal by a corresponding one of a plurality of cosine waves to produce a plurality of multiplied cosine waves, each of the cosine waves having a frequency substantially equal to the frequency of an associated harmonic in the AC power.

11. The inverter system of claim 10 wherein the generating means further comprises means for combining the multiplied sine and cosine waves to produce the harmonic waveform.

12. The inverter system of claim 11 wherein the controlling means includes a comparator for comparing the harmonic waveform with a triangle wave to obtain a PWM waveform.

13. The inverter system of claim 12 wherein the inverter includes a plurality of inverter switches and wherein the controlling means further includes means for deriving control signals for the inverter switches from the PWM waveform.

14. An inverter system for inverting DC power into AC power and for reducing selected harmonics in the AC power, the AC power having a fundamental frequency and the selected harmonics being harmonics of the fundamental frequency, the inverter system comprising:
inverting means for inverting the DC power into the AC power;
harmonic sensing means connected between an AC output of the inverter and a load for sensing a component of the selected harmonics;
function generating means for generating a sinusoidal function dependent upon the component;
PWM pulse generating means responsive to the sinusoidal function for generating PWM pulses; and,
connecting means for connecting the PWM pulses to the inverting means, the PWM pulses controlling the inverting means so as to reduce the selected harmonics in the AC power.

15. The inverter system of claim 14 wherein the harmonic sensing means comprises means for determining a plurality of components, each of the components being dependent upon a different one of the selected harmonics.

16. The inverter system of claim 15 wherein the function generating means comprises means for comparing each of the components to a corresponding reference to produce a plurality of errors, each of the errors being dependent upon a different one of the components.

17. The inverter system of claim 16 wherein the function generating means further comprises means for multiplying each of the errors by a corresponding one of a plurality of sinusoidal functions to produce a plurality of multiplied functions, each of the sinusoidal functions having a frequency substantially equal to the frequency of the selected harmonic associated with the error by which it is multiplied.

18. The inverter system of claim 17 wherein the function generating means further comprises means for adding the multiplied functions together to produce a composite function.

19. The inverter system of claim 18 wherein the PWM pulse generating means comprises means for comparing the composite function to a triangular wave in order to produce the PWM pulses, the inverting means inverting the DC power into AC power in response to the PWM pulses so as to reduce the selected harmonics in the AC power.

20. A method for inverting DC power into AC power comprising the following steps:
supplying DC power to an inverter;
inverting the DC power to AC power;
sensing harmonics in the AC power wherein each of the harmonics has a frequency;
comparing each of the harmonics to a reference in order to produce a plurality of errors, each error being dependent upon a different one of the harmonics;
producing a plurality of multiplied functions by multiplying each of the errors by a corresponding one of a plurality of sinusoidal functions, each of the sinusoidal functions having a frequency substantially equal to the frequency of the harmonic from which its corresponding error is produced;
comparing the multiplied functions to a triangular wave to produce PWM pulses; and,
supplying the PWM pulses to the inverter, the inverter inverting the DC power into AC power in response to the PWM pulses so as to reduce the harmonics in the AC power.

21. The method of claim 20 wherein the step of sensing harmonics comprises the step of determining a plurality of components, each of the components being dependent upon a different one of the harmonics.

22. The method of claim 21 wherein the step of comparing each of the harmonics to a reference comprises the step of comparing each of the components to a reference to produce the plurality of errors, each of the errors being dependent upon a different one of the components.

23. The method of claim 22 wherein the step of comparing the multiplied functions to a triangular wave to produce PWM pulses comprises the steps of adding the multiplied functions together to produce a composite function and of comparing the composite function to the triangular wave to produce the PWM pulses.

24. The method of claim 23 wherein the step of supplying the PWM pulses to the inverter comprises the step of supplying the PWM pulses to at least one inverter switch so as to produce inverter output PWM pulses having substantially reduced harmonic content.

25. The method of claim 24 wherein the step of producing the plurality of functions comprises the steps of integrating the errors to produce a plurality on integrated errors and of multiplying each of the integrated errors to a corresponding one of the plurality of sinusoidal waveforms to produce the plurality of multiplied functions.

* * * * *